(12) United States Patent
Römer et al.

(10) Patent No.: US 6,698,244 B1
(45) Date of Patent: Mar. 2, 2004

(54) METHOD FOR REFINING MOLTEN GLASS (75) Inventors: Hildegard Römer, Karben (DE); Werner Kiefer, Mainz (DE); Detlef Köpsel, Mainz (DE); Peter Nass, Mainz (DE); Erich Rodek, Mainz (DE); Uwe Kolberg, Mainz-Kastel (DE); Thomas Pfeiffer, Ingelheim (DE)

(73) Assignee: Schott Glas, Mainz (DE)

( * ) Notice: Subject to any disclaimer, the term of this patent is extended or adjusted under 35 U.S.C. 154(b) by 104 days.

(21) Appl. No.: 09/641,594

(22) Filed: Aug. 18, 2000

(30) Foreign Application Priority Data

Aug. 21, 1999 (DE) .......................... 199 39 771

(51) Int. Cl.⁷ ............................. C03B 5/225
(52) U.S. Cl. .................. 65/134.3; 65/134.9; 65/135.2
(58) Field of Search .................. 65/134.3, 134.9, 65/135.2, 136.3; 423/328.1, 332; 501/4, 65, 66, 68

(56) References Cited

U.S. PATENT DOCUMENTS

| | | | |
|---|---|---|---|
| 3,511,629 A | | 5/1970 | Bauer et al. |
| 3,830,749 A | * | 8/1974 | Deeg et al. ........... 252/301.4 F |
| 3,954,656 A | * | 5/1976 | Deeg et al. ........... 252/301.4 F |
| 3,997,313 A | * | 12/1976 | Alexander ................... 501/37 |
| 4,110,097 A | | 8/1978 | Chevallier et al. |
| 4,396,720 A | | 8/1983 | Beall et al. |
| 4,633,481 A | * | 12/1986 | Schwenninger ............. 373/152 |
| 4,687,646 A | * | 8/1987 | Mateika et al. ............. 219/422 |
| 4,780,121 A | | 10/1988 | Matesa |
| 5,006,144 A | * | 4/1991 | Knavish et al. ............. 65/134.2 |
| 5,045,509 A | * | 9/1991 | Kiefer ........................ 428/426 |
| 5,367,532 A | * | 11/1994 | Boen et al. ................. 373/142 |
| 5,665,137 A | | 9/1997 | Huang |
| 5,770,535 A | * | 6/1998 | Brix et al. .................... 501/67 |
| 5,801,109 A | * | 9/1998 | Nishizawa et al. ........... 501/66 |
| 5,851,253 A | * | 12/1998 | Pet et al. .................... 501/134 |
| 5,895,768 A | * | 4/1999 | Speit .................... 428/694 ST |
| 5,908,703 A | * | 6/1999 | Brix et al. ................... 349/158 |
| 5,922,097 A | * | 7/1999 | Kobayashi et al. ......... 65/134.1 |
| 6,074,969 A | * | 6/2000 | Naumann et al. ............. 501/64 |
| 6,096,670 A | * | 8/2000 | Lautenschlager et al. ... 428/426 |
| 6,121,175 A | * | 9/2000 | Drescher et al. ............. 106/35 |
| 6,408,650 B1 | * | 6/2002 | Boulos et al. ................ 501/70 |

FOREIGN PATENT DOCUMENTS

| | | |
|---|---|---|
| DE | 1596737 | 2/1971 |
| DE | 3316546 | 4/1984 |
| DE | 3801840 | 8/1989 |
| DE | 19616633 | 5/1997 |
| DE | 19603698 | 8/1997 |
| DE | 19617344 | 8/1997 |
| DE | 19725552 | 12/1998 |
| DE | 19739912 | 12/1998 |
| DE | 19747354 | 12/1998 |
| EP | 0156479 | 10/1985 |
| EP | 0176897 | 7/1988 |
| EP | 0462028 | 12/1991 |
| FR | 756495 | 12/1933 |
| FR | 776403 | 1/1935 |
| FR | 2033386 | 12/1970 |
| GB | 845982 | 8/1960 |
| JP | 0090301737 | 5/1996 |
| SU | 133204 | 12/1960 |
| WO | 8300685 | 3/1983 |
| WO | 9215531 | 9/1992 |

OTHER PUBLICATIONS

Glastechnische Fabrikationsfetiler Pathologische Ausnahmezustuande des Werkstoffes Glas und ihre Behehung pp. 195–239, 1980 (no month available).

Use of Induction Furnaces with a Cold Crucible for Melting Hard Glasses (Review) 2302 Glass and Ceramics, 43 (1986) Sep.–Oct., Nos. 9–10, N.Y., N.Y. USA pp. 391–396.

* cited by examiner

*Primary Examiner*—Sean Vincent
(74) *Attorney, Agent, or Firm*—Nils H. Ljungman & Associates (57) ABSTRACT

The invention describes a method for refining molten glass materials, in which refining gas is generated by refining agents in the molten glass, and in which the molten glass is heated to a temperature of between 1650° C. and 2800° C., and the maximum release of refining gas by the refining agents takes place at over 1500° C.

23 Claims, 2 Drawing Sheets

METHOD FOR REFINING MOLTEN GLASS

BACKGROUND OF THE INVENTION

The invention relates to a method refining molten glass, in which refining gas is generated by refining agents in the molten glass.

In the context of molten glass, the term refining is understood to mean the removal of gas bubbles from the molten material. To achieve the maximum possible freedom from foreign gases and bubbles, it is necessary for the molten mix to be thoroughly mixed and degassed.

The behaviour of gases or bubbles in molten glass and the way in which they are removed are described, for example, in "Glautechnische Fabrikationsfebler" [Glass Engineering Manufacturing Errors], edited by B. Jebsen-Marwedel and R. Bruckner, 3rd edition, 1990, springer Vertag, on pages 195 ff.

In general terms, two refining principles which differ significantly through the way in which the refining gas is generated are known.

In the physical refining methods, by way of example the viscosity of the molten glass is reduced by increasing the temperature. Therefore, to reduce the viscosity higher temperatures of the molten glass are set during the refining than in the melting and cooling-down period. The higher the refining temperature selected can be, the more effective the removal of bubbles from the molten material. If possible, the viscosity of the molten material should be below $10^2$ dPas. However, the maximum permissible refining temperature is limited by the ability of the wall material of the melting unit used to withstand such temperatures and, where Pt alloys are used, is at most 1600° C. while where refractory bricks are used, it is at most 1650° C. to 1700° C.

Further physical refining methods are distinguished by the fact that the flow inside the molten glass is influenced by causing mechanical movements of the molten material by poling or by blowing in gas, by the fact that the molten material is mechanically vibrated by the action of sound or ultrasound or bubbles are removed by means of centrifuging. Furthermore, vacuum (vacuum refining) or pressure (high-pressure refining) is employed, or intensified bubble nucleation is initiated by roughening of the surface.

Most commonly, chemical refining methods are employed. The principle of such methods consists in adding to the molten material compounds which decompose and split off gases, or compounds which are volatile at elevated temperatures, or compounds which release gases in an equilibrium reaction at elevated temperatures.

The first group of compounds includes, for example, sodium sulphate, which is used for refining soda-lime glass materials. In this case, $SO_2$ and $O_2$ are released in a temperature range of from 1300° C. to 1450° C., with a maximum at 1380° C. This temperature range approximately corresponds to the refining range for glass materials of this type.

Compounds which are volatile at high refining temperatures owing to their vapour pressure and act in this way include halides. By way of example, a series of borosilicate glass materials are refined using NaCl.

Finally, the last group of substances comprises the so-called redox refining agents, such as for example arsenic oxide and antimony oxide. In this case, the redox refining agents used are polyvalent ions which can occur in at least two oxidation states which are in a temperature-dependent equilibrium with respect to one another, a gas, generally oxygen, being released at high temperatures.

The redox equilibrium of the substance dissolved in the molten material can be demonstrated with reference to the example of arsenic oxide using the equation (I)

$$AS_2O_5 \rightleftharpoons As_2O_3 + O_2 \uparrow \qquad (I).$$

The equilibrium constant K for (I) can be formulated as shown in equation (II):

$$K(T) = \frac{a_{As_2O_3} \cdot PO_2}{a_{As_2O_5}} \qquad (II).$$

In this equation, $aAs_2O_3$ and $aAs_2O_5$ denote the activities of arsenic trioxide and arsenic pentoxide, respectively, and $pO_2$ denotes the fugacity of oxygen.

The equilibrium constant K is highly temperature-dependent, and a defined oxygen fugacity $pO_2$ can be set using the temperature and the activity of the oxidic arsenic compounds.

For the chemical refining, it is possible to distinguish between substantially three refining effects:

1) a primary refining effect, under which the gases which are formed during decomposition of the refining agents added, for example oxygen from redox refining agents, diffuse into the bubbles which are formed during the decomposition of the mix, for example $CO_2$, $N_2$, $H_2O$, NO, $NO_2$ bubbles;

2) a secondary refining effect, under which gases are removed from the molten glass, involving the spontaneous formation of gas bubbles by the refining agents added, e.g. $O_2$ bubbles from redox refining agents. Foreign gases, such as $CO_2$, $H_2O$, $N_2$, NO, $NO_2$, can diffuse into these refining bubbles even if their partial pressure is below $10^5$ Pa, and 3) a so-called resorption effect, under which bubbles which have formed as described in 1) or 2), and in the event of a temperature reduction expanded bubbles of, for example, oxygen which are still in the molten material, are dissolved, for example in the case of the redox equilibrium (I) through a shift of the equilibrium towards the starting material.

For high-melting glass material which only have a viscosity of $<10^2$ dPas above 1700° C., the known refining agents, such as $Na_2SO_4$. NaCl, $As_2O_5$ or $Sb_2O_5$, are ineffective. The refining gases are released as early as during melting, and therefore the refining gases are no longer available for the secondary refining effect. Only the primary refining effect takes place. Standard redox refining agents, such as $As_2O_5$ or $Sb_2O_5$, are effective at releasing refining oxygen between 1150° C. and 1500° C., with a maximum at 1220° C. to 1250° C., the release of oxygen outside the refining temperature being substantially dependent on the glass composition and on the refining-agent composition (one or more refining agents). Particularly for high-melting glass materials, it is necessary to add larger amounts of refining agent than are actually required in order to achieve a refining effect at all. The large amounts of refining agent represent a particular drawback with arsenic oxide and antimony oxide, since these are highly toxic and expensive compounds. Moreover, the addition of refining agents may have an adverse effect on the properties of the glass material and may increase the production costs, since they are generally expensive compounds owing to the interaction with the tin float bath, arsenic oxide and antimony oxide cannot be used in the float glass process. The fact that high-melting glass materials only reach the viscosity of <$10^2$ dPas, which is advantageous for the refining, at temperatures above those which are conventionally achievable means that such materials are difficult to refine or else effective refining is altogether impossible.

A series of patents have attempted to use $SnO_2$, which releases its maximum level of refining gas at elevated temperatures as refining agent for high-melting glass materials.

By way of example, DE 196 03 698 C1 which corresponds to U.S. Pat. No. 5,770,535 issued on Jun. 23, 1998 to Brix, et al. and entitled "Alkali-free aluminoborosilicate glass and its use," has disclosed the use of from 0.5 to 2.0% by weight $SnO_2$ as refining agent for refining alkali-metal-free aluminoborosilicate glass, the refining of the molten glass being carried out at 1600° C.

The use of from 0.02 to 1.0 mol % $SnO_2$ and of from 0.02 to 0.5 mol % $CeO_2$ as refining agents for refining aluminosilicate glass materials which can be chemically tempered is known from DE 196 16 633 C1, which corresponds to U.S. Pat. No. 5,895,768 issued on Apr. 20, 1999 to Speit and entitled "Chemically prestressable aluminosilicate glass and products made therefrom". The refining is carried out at 1580° C. in a Pt crucible.

The use of from 0.5 to 2.0% by weight $SnO_2$, preferably together with nitrates, as refining agents for refining alkali-metal-free aluminoborosilicate glass is also known from DE 196 17 344 C1 with a refining temperature of 1620° C. being set i a quartz crucible.

DE 197 39 912 C2 mentions the use of from 0.2 to 1% by weight $SnO_2$ and 0.1 to 0.5% by weight $CeO_2$, inter alia, as refining agents, and the extremely good refining action achieved with a combination of the two refining agents is pointed out. The aluminoborosilicate, glass claimed is refined at a temperature of 1620° C. in a crucible made from $SiO_2$ ceramic.

The maximum release of refining gas by $SnO_2$ is in the upper range of the melting temperature which can conventionally be achieved. Therefore, in all these examples it is attempted to refine high-melting glass materials by metering in generally high levels of the refining agents, which often has an adverse effect on the product properties, such as in the case of $SnO_2$ on the crystallization stability, or in the case of colouring oxides such as $CeO_2$ on the colour locus of the product. In the case of high-melting glass materials, the fusion temperature lies in the maximum permissible temperature range for the tank furnaces made from ceramic refractory material or platinum.

For aluminosilicate glass and glass ceramic materials, the viscosity range of <$10^2$ dPas which is advantageous for the refining is only reached at over 1700° C., i.e. in a temperature range which cannot be reached using conventional melting technology and refining methods.

The invention is based on the object of finding a method for refining molten glass in which refining gas is generated by refining agents in the molten glass, which makes it possible to fully exploit the refining potential of known refining agents, which permits the use of novel refining agents, which improves or allows the refining of high-melting glass materials, in particular the refining of glass materials which only reach a viscosity of <$10^2$ dPas at over 1700° C., which reduces the tendency to reboiling, which eliminates or considerably reduces the use of toxic refining agents and which allows the refining agents to be metered in in smaller quantities (while maintaining a constant or even improved refining action). The release of refining gas by refining agents is to take place in a temperature range within which the viscosity of the molten glass is sufficiently low to allow the bubbles to rise quickly to the surface of the molten material.

Furthermore, the method is to allow a significant reduction in the refining time and/or a significantly smaller refining volume compared to the prior art.

SUMMARY OF THE INVENTION

This object is achieved by the fact that a method for refining molten glass materials in which refining gas is generated by refining agents in the molten glass is provided, in which method the molten glass is heated to a temperature of between 1650° C. and 2800° C. and the maximum release of refining gas by the refining agents takes place at over 1500° C. and preferably over 1650° C.

Advantageous modifications of the method form the subject matter of the dependent patent claims.

The advantages of the refining method according to the invention essentially consist in the fact that, unlike in the prior art, the refining potential of known refining agents is fully exploited. Improved and therefore more effective refining is achieved using standard amounts of known refining agents, or refining which is just as good as that achieved previously is obtained using smaller amounts of known refining agents than is customary, due to the higher refining temperature.

The method according to the invention also makes it possible to carry out a secondary refining for high-melting glass materials. The fact that the molten glass is heated to a temperature of between 1650° C. and 2800° C. and that the maximum release of refining gas by the refining agents takes place at over 1500° C. means that spontaneous bubbles of refining gas are generated for the first time within this temperature range. The temperature range for the formation of bubbles of refining gas lies above the temperature range for the melting of the glass. The residual gases which remain in the molten glass after melting, such as for example $CO_2$, NO2, $SO_2$, $H_2O$, can diffuse into the bubbles of refining gas, even if their partial pressure is already below $10^5$ Pa. The reduction in the partial pressure of the residual gases leads to a significant reduction in the risk of the molten glass reboiling. Toxic refining agents which have hitherto been customary, such as $As_2O_5$ and $Sb_2O_5$, can be dispensed with altogether, or the amount of such agents can be reduced considerably. In general terms, significantly smaller amounts of the refining agents can be metered in, while maintaining a constant or even improved refining of the molten glass. Moreover, a considerable reduction in the refining time is achieved, and the refining volume can be reduced significantly.

In a preferred procedure, the molten glass for refining is heated to a temperature of between 1700° C. and 2400° C., the maximum generation of refining gas by the refining agents taking place at over 1600° C., and preferably over 1700° C.

In addition to the advantageous chemical refining, the physical refining which is improved as a result of the high temperatures also plays an important role. At the high temperatures involved, the viscosity of the molten material falls, so that the rate at which the bubbles rise is significantly increased. Thus, the rate at which the bubbles rise in molten glass which has been heated to 2400° C. is approximately 100 times greater than in a corresponding molten material which has been heated to 1600° C. This means that given a rate of rise which is 100 times higher, the residence time for the molten glass (refining time) can be reduced by a factor of 100.

Moreover, the diffusion of the foreign gases which are dissolved in the molten material ($CO_2$, $N_2$, . . . ) is higher at high temperatures than at conventional temperatures. Consequently, the degassing proceeds more quickly. The gases diffuse more quickly into refining bubbles. Furthermore, there is considerable convection at the high temperatures of the molten glass, ensuring that each volumetric element of the molten glass passes into that part of the molten glass which is close to the surface at regular intervals, and in that area the bubbles are expelled owing to the lifting forces acting on them. Moreover, the convection means that each volumetric element of the molten material is passed through the hottest regions of the refining unit, so that the refining agents can reveal their full potential.

The combination of all these effects, namely chemical refining, expansion of the bubbles owing to the high temperature, considerable convection and a high rising rate of the bubbles owing to the low viscosity, results in rapid and effective refining of the molten glass.

For example, the typical refining time for molten glass which is 50 cm deep and at a temperature of 1600° C. in a melting unit with a capacity of 50 l is one day in order to remove all bubbles with a radius of less than 0.3 mm using their buoyancy. By contrast, a refining temperature of 2400° C. results in a refining time of 5 minutes without taking the convection into account and of 2 minutes taking the convection into account.

Preferably, the viscosity of the molten glass is set at a level of less than $10^3$ dPas, and particularly preferably at a level of less than $10^2$ dPas. It has been found that although making it easier for the bubbles to rise up owing to the lower viscosity does, as expected, have a positive influence on the refining, this effect is not sufficient to dispense with the use of refining agents. For aluminosilicate glass and glass ceramic materials, a viscosity of less than $10^2$ dPas is reached at over 1650° C., often above 1700° C., so that these glass materials can for the first time be subjected to effective, i.e. improved and time-saving, refining.

It has proven particularly advantageous if the method is carried out in such a way that the molten glass is set to the temperature at which the maximum release of refining gas by the refining agents takes place, i.e. a maximum of refining gas is generated and released using a minimum amount of refining agent, thus contributing to refining of the molten glass.

To carry out the refining method according to the invention as advantageously as possible, it is expedient if the refining agents added are redox compounds, in particular redox oxides, such as $SnO_2$, $CeO_2$, $Fe_2O_3$, $ZnO$, $TiO_2$, $V_2O_5$, $MoO_3$, $WO_3$, $Bi_2O_5$, $PrO_2$, $Sm_2O_3$, $Nb_2O_5$, $Eu_2O_3$, $TbO_2$ and/or $Yb_2O_3$. In principle, all redox compounds which release the maximum amount of refining gas at over 1500° C., in particular over 1600° C., are suitable.

Some rare earth oxides which also release a maximum amount of refining gas at over 1600° C. are also of interest for the redox refining.

It has been possible to demonstrate that with the known refining agents such as $SnO_2$ and $CeO_2$, the maximum release of refining gas takes place at temperatures over 1500° C., and that surprisingly redox oxides, such as $Fe_2O_3$, $ZnO$, $TiO_2$, $V_2O_5$, $MoO_3$, $WO_3$, $Bi_2O_5$, $PrO_2$, $Sm_2O_3$, $Nb_2O_5$, $Eu_2O_3$, $TbO_2$ and/or $Yb_2O_3$, can be used to equally good effect as refining agents, the maximum release of refining oxygen from these oxides likewise taking place at over 1500° C.

Table 1 gives a number of examples of such redox compounds, as well as the temperature range within which the oxygen is released. The temperatures at which oxygen is released from the redox compounds also depend on the composition of the glass material.

TABLE 1

Redox reactions and temperature range of maximum oxygen release:

| Redox reaction: | | | $O_2$ release: |
|---|---|---|---|
| $2\ CeO_2$ | $\rightarrow$ $\leftarrow$ | $Ce_2O_3 + ½ + O_2$ | 1500–1700° C. |
| $SnO_2$ | $\rightarrow$ $\leftarrow$ | $SnO + ½\ O_2$ | 1600–1900° C. |
| $Fe_2O_3$ | $\rightarrow$ $\leftarrow$ | $2\ FeO + ½\ O_2$ | 1800–2000° C. |
| $MoO_3$ | $\rightarrow$ $\leftarrow$ | $MoO_2 + ½\ O_2$ | 1800–1900° C. |
| $ZnO$ | $\rightarrow$ $\leftarrow$ | $Zn + ½\ O_2$ | 1900–2100° C. |
| $2\ TiO_2$ | $\rightarrow$ $\leftarrow$ | $Ti_2O_3 + ½\ O_2$ | 2000–2200° C. |
| $V_2O_5$ | $\rightarrow$ $\leftarrow$ | $V_2O_3 + O_2$ | 2200–2400° C. |
| $Bi_2O_3$ | $\rightarrow$ $\leftarrow$ | $2\ Bi + 3/2\ O_2$ | 1700–1800° C. |

The temperature ranges shown in Table 1 were determined using aluminosilicate glass materials.

The invention is not restricted to these redox compounds or to polyvalent redox compounds. Compounds which release oxygen at temperatures of between 1600° C. and 2400° C. and are converted into the metallic form, such as for example $ZnO$, $SnO$, $Sb_2O_3$, $As_2O_3$ and $Bi_2O_3$, are also suitable for redox refining.

Which redox compound is used as the refining agent depends on the other requirements imposed on the glass.

Many of the redox compounds colour the glass. The fact that, according to the claimed method, even small amounts of refining agents, in some cases <0.2% by weight, considerably improve the refining has a positive effect in this connection.

In addition to the colouring effect, some of the rare earth oxides are very expensive and are only suitable under exceptional circumstances.

The wide range of redox compounds which can be used means that with the claimed method it is in many cases possible to dispense altogether with the use of the toxic antimony-containing and/or arsenic-containing refining agents.

In addition to the redox refining agents, it is also possible to use inorganic salts as refining agents for the high-temperature refining, which salts have a vapour pressure of greater than $10^5$ Pa at over 1500° C., in particular over 1600° C. Preferably, the inorganic salts added to the mix as refining agents are halides.

As described above, the refining action of the halides resides in the fact that they pass into the gaseous state. Examples of chlorides which release maximum amounts of refining gas at over 1500° C., in particular over 1600° C., are $KCl$, $CaCl_2$, $BaCl_2$, $LaCl_3$, $CeCl_3$, $YbCl_2$, $ErCl_3$ and $PrCl_3$. In addition to the chlorides, in particular a large number of fluorides have a vapour pressure of $>10^5$ Pa at over 1500° C., such as for example $LiF$, $NaF$, $KF$, $ZnF_2$, $MgF_2$, $BaF_2$, $CeF_2$ or a series of rare earth fluorides.

A number of bromides also have a vapour pressure of $>10^5$ Pa at over 1500° C. and can in principle be used according to the invention as refining agents. However, where possible the use of such bromides should be avoided for health and safety reasons.

During halide refining, it should be ensured that in each case the halide with the lowest vapour pressure forms and evaporates first, irrespective of the compound in which the halide was added to the mix. For example, if the glass contains lithium oxide and if KCl is added as the refining agent, LiCl evaporates at approximately 1350° C., while the KCl does not evaporate at over 1500° C. The chlorine can also escape from the molten glass as HCl.

The abovementioned halide refining agents can only exhibit their refining action at over 1500° C. if the glass does not contain any components which are able to form halides with a lower evaporation temperature.

The refining action of the halides also depends on how highly soluble the halides are in the glass material.

It is also advantageous if the refining agents added are inorganic salts which decompose, releasing refining gas, at over 1500° C., in particular over 1600° C., and the decomposition products have a gas pressure of greater than $10^5$ Pa. The inorganic salts used preferably contain oxo anions, in particular sulphates. For example, pure $Na_2SO_4$ reaches a gas pressure of greater than $10^5$ Pa at approximately 1850° C. With sulphates, decomposition takes place so as to form $SO_2$ and $O_2$.

Examples of preferred sulphates with decomposition temperatures of over 1500° C. are $K_2SO_4$, $MgSO_4$, $CaSO_4$, $SrSO_4$, $BaSO_4$ and $La_2(SO_4)_3$. The method is not restricted to the sulphates listed above. In the case of sulphate refining too, effective refining can only be achieved if the solubility of the sulphates in the glass material which is to be refined is sufficiently high.

Particularly in the case of aluminosilicate glass materials, the solubility of the sulphates is relatively low, and therefore the sulphates can frequently only be used in combination with other refining agents.

The release of refining gas is preferably established by one refining agent or by a combination of a plurality of refining agents.

It is preferable to add non-toxic refining agents.

In a further, preferred procedure, the refining is assisted by physical refining methods as mentioned in the introduction.

The molten glass is preferably heated in a forcibly cooled crucible or a forcibly cooled tank furnace. It is particularly preferable for the molten glass to be heated in a forcibly cooled skull crucible by high-frequency means.

Glass materials which have a particularly high melting temperature and only reach a viscosity of <$10^2$ dPas at over 1650° C. are refined effectively by means of the method according to the invention.

The amount of refining agent required lies in the range from 0.01 to 3% by weight and is therefore dependent on the refining temperature and the refining time. The optimum redox refining agent or a combination of optimum redox refining agents can be selected from Table 1 according to the required refining temperature. Conversely, Table 1 offers a point of reference for determining the refining temperature at which the maximum release of refining gas by the refining agents takes place. It is then possible to use simple experiments to determine the optimum refining temperature for each molten glass composition and for a specific refining agent or for a plurality of specific refining agents. The viscosity of the molten material plays an important role in selecting the refining agents. For effective refining, the viscosity should be less than $10^3$ dPas, and preferably less than $10^2$ dPas. The lower the viscosity, the more positive this is for the refining. The energy costs required to heat the high-temperature refining part are to be regarded as a factor limiting the extent to which this fact can be optimized, since these costs rise as the refining temperature increases, owing to the rising energy losses through the wall of the melting unit.

The energy loss at the high melting temperatures can be kept at a low level because the dimensions of the refining crucible required can be small, owing to the high refining rate.

In the case of glass materials with highly volatile constituents, it should be noted that the evaporation of these highly volatile components increases as the refining temperature rises.

The above-discussed embodiments of the present invention will be described further hereinbelow with reference to the accompanying figures. When the word "invention" is used in this specification, the word "invention" includes "inventions", that is, the plural of "inventions". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

Additional advantages and characteristics of the invention are described in greater detail below, with reference to exemplary embodiments that are illustrated in the accompanying drawings.

The following figures and examples explain the invention, and in the drawing.

DESCRIPTION OF THE PREFERRED EMBODIMENT

Figure 1:
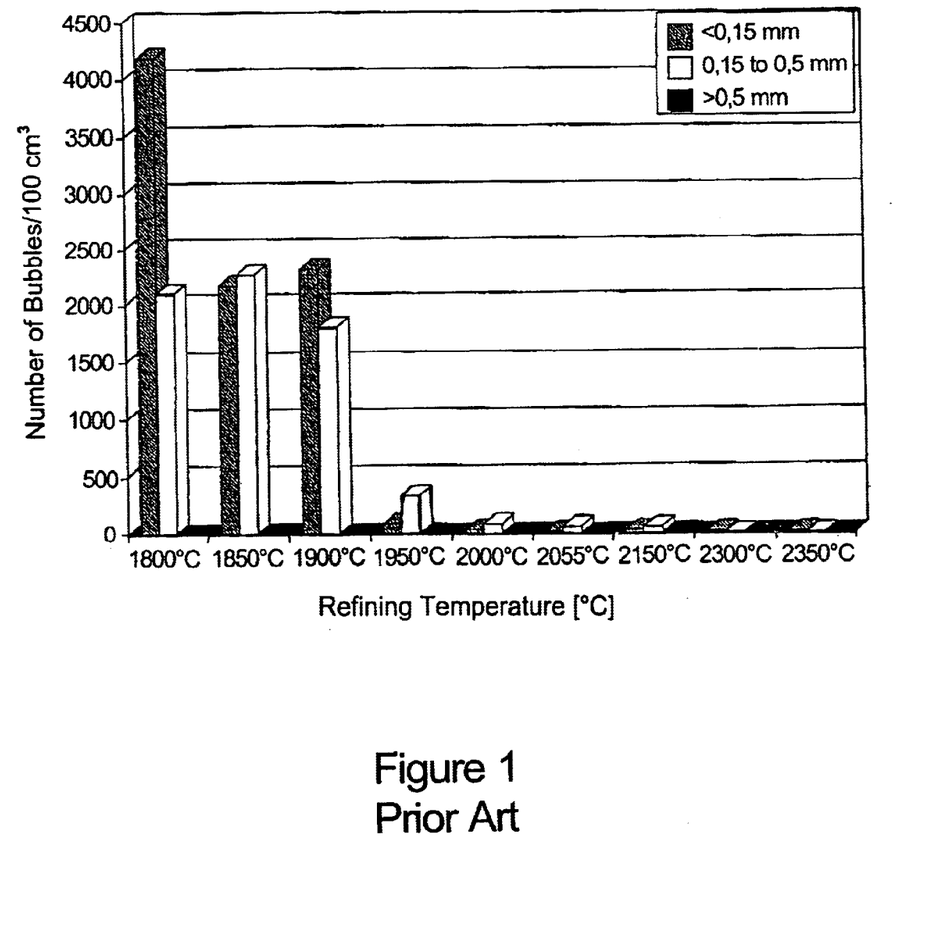
FIG. 1: shows the number of bubbles per 100 cm³ of aluminosilicate glass and the bubble size plotted against the refining temperature.
Figure 2:
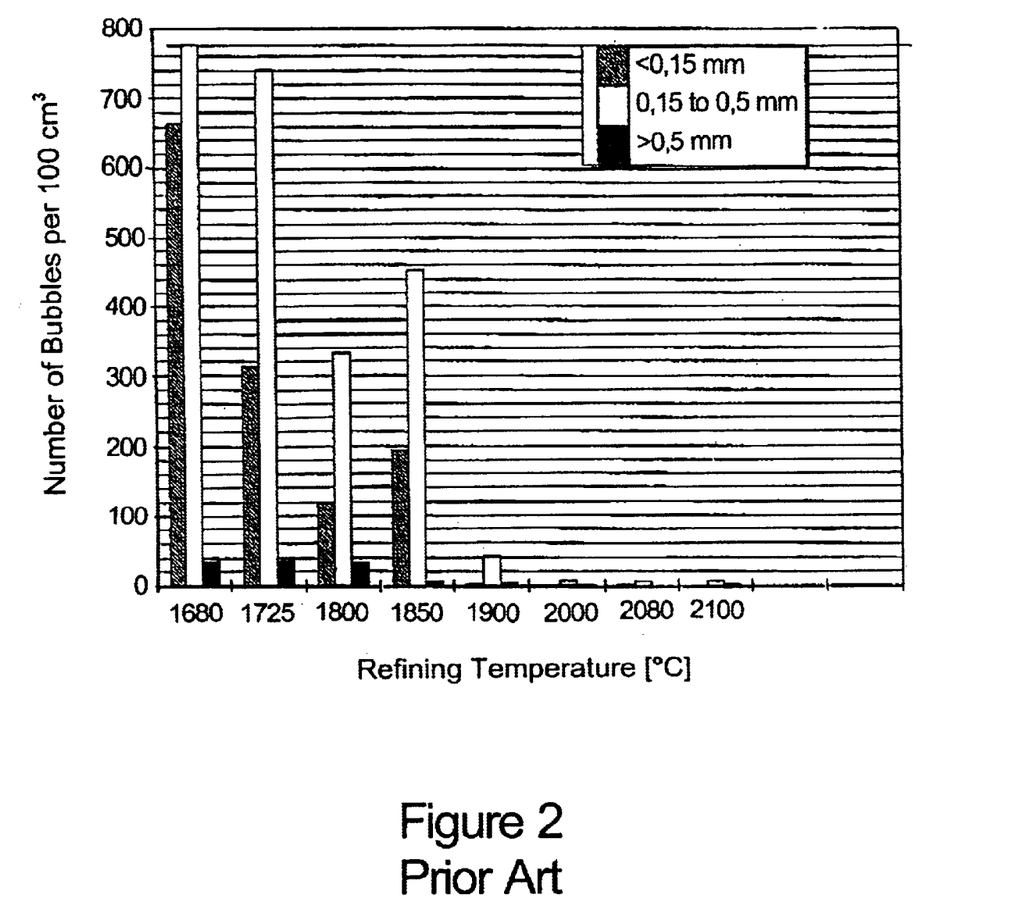
FIG. 2: shows the number of bubbles per 100 cm³ of aluminosilicate glass, and the bubble size, plotted against the refining temperature, with the aluminosilicate glass having been refined according to the invention.

For an aluminosilicate glass of the following composition (in % by weight): $Li_2O$: 3.75; $Na_2O$: 0.50; MgO: 0.50; $Al_2O_3$: 22.0; $SiO_2$: 65.0; $TiO_2$: 2.5; $V_2O_3$: 0.3; ZnO: 1.75; $ZrO_2$: 1.7; BaO: 2.0 an optimum refining temperature of 2300° C. was found (FIG. 1). By adding only 0.09% by weight of $SnO_2$, it is possible to lower the optimum refining temperature to 2000° C. (FIG. 2).

In the case of borosilicate glass materials (Schott Glas 8412), very good bubble qualities were obtained at refining temperatures in the region of 1900° C. in combination with small amounts of iron oxide and sulphate as refining agents. The quality of bubbles obtained is better (by a factor of approximately 4) than in the reference test carried out using arsenic oxide as refining agent and conventional refining temperatures of 1600° C.

In soda-lime glass (television screen glass), it was possible to achieve very good results in terms of the number of bubbles using $CeO_2$, Zno, $TiO_2$ and temperatures of around 1800° C. to 2000° C. The quality of bubbles achieved in this case is considerably better than with refining using antimony oxide at conventional temperatures.

In all three examples for the high-temperature method, the refining times required are in the region of 30 minutes. These represent considerably shorter refining times than those achieved using the toxic refining agents arsenic oxide or antimony oxide and conventional refining temperatures of approximately 1600° C. In this case, it was determined, using crucible tests, that to achieve similar numbers of bubbles as those achieved with high-temperature refining, refining times of at least 3 hours are required for conventional melting with arsenic oxide or antimony oxide. The shorter refining times in the high-temperature tests are attributable to the higher refining temperatures. The higher the temperature of the redox reaction, the quicker the bubbles form and grow, owing to the rising coefficient of diffusion as the temperature increases, and the faster the bubbles rise, owing to the lower viscosity of the molten material.

In crucible tests carried out at elevated temperatures, refining agents such as $CeO_2$ or $SnO_2$ exhibit a significantly more effective refining action than at conventionally available temperatures. In the case of cerium oxide and tin oxide, this can be explained by the fact that although these oxides already release initial amounts of oxygen in the range from around 1500° C. to 1600° C., a significant shift of the equilibrium towards the reduced form only takes place, as has emerged over the course of the present invention, at temperatures above those which can conventionally be reached. In the case of sulphate, tests have shown that the decomposition rises continuously as the refining temperature increases up to 2400° C., and this is expressed by a reduction of the residual sulphate content. The refining action of the sulphate is improved as the refining temperature rises. Moreover, the likelihood of a glass material which has been refined using sulphate at high temperatures reboiling is reduced considerably, since the residual sulphate content is lower.

The high temperatures required in the method according to the invention may, for example, be reached by the inductive introduction of an electromagnetic field with frequencies which preferably lie in the range from 10 kHz to 5 MHz (high-frequency melting). The electromagnetic field generates alternating currents in the molten glass, which has generally, been preheated and is electrically conductive, and these currents, owing to the Joule effect, lead to direct heating of the molten materials to the abovementioned temperatures. Preferably, the molten glass materials which have been heated in this way have an electrical conductivity of $>0.01$ $\Omega^{-1}$ $cm^{-1}$ at approximately 1600° C. Since, in this method, the energy is introduced directly into the molten material, it is possible to cool the wall region of the melting unit. This can be effected by free radiation of heat, air cooling or water cooling. So-called skull crucibles made from water-cooled copper tubes as described, for example, for growing crystals in DE 33 16 546 C1, have proven useful as refining units which remain stable over a prolonged period. The metallic walls, by being slotted, are designed in such a way that they are transparent to high-frequency radiation. Due to the water cooling in the wall area of the molten material, a layer of material of its own type forms, in which the molten material is embedded. In this way, it is possible to reach melting temperatures of up to 3000° C. The limit is essentially set only by the maximum available capacity of the high-frequency generator and the maximum output which can be dissipated via the cooling water. The way in which units of this type can be used for the refining of glass is described in documents EP 0 176 897 B1, which corresponds to U.S. Pat. No. 4,633,481 issued to Schwenninger on Dec. 30, 1986 and entitled "Induction heating vessel". U.S. Pat. No. 4,780,121, EP 0 462 028 A1 and WO 92/15531A1 which corresponds to U.S. Pat. No. 5,367,532 issued to Boen, et al. on Nov. 22, 1994 and entitled "Furnace for the continuous melting of oxide mixtures by direct induction with high frequency, a very short refining time and a low energy consumption". These documents describe refining temperatures which can conventionally be achieved of up to 1600° C., while EP 0 462 028 A1 also refers to the advantages of high melting temperatures of over 2000° C. and the physical, refining which is improved in this way.

One feature of the invention resides broadly in the method for refining molten glass, in which refining gas is generated by refining agents in the molten glass, characterized in that the molten glass is heated to a temperature of between 1700 degree C. and 2800 degree C., and the maximum release of refining gas by the refining agents takes place at over 1600 degrees C.

Another feature of the invention resides broadly in the method characterized in that the molten glass is heated to a temperature of between 1700 degree C. and 2400 degree C.

Yet another feature of the invention resides broadly in the method characterized in that the viscosity of the molten glass is set to a level of less than 103 dPas.

Still another feature of the invention resides broadly in the method characterized in that the viscosity of the molten glass is set to a level of less than $10^2$ dPas.

A further feature of the invention resides broadly in the method characterized in that the molten glass is heated to the temperature at which the maximum release of refining gas by the refining agents takes place.

Another feature of the invention resides broadly in the method characterized in that the refining agents added are redox compounds, in particular redox oxides, such as SnO2, CeO2, Fe2O3, ZnO, TiO2, V2O5, MoO3, WO3, Bi2O5, PrO2, Sm2O3, Nb2O5, Eu2O3, TbO2, and/or Yb2O3.

Yet another feature of the invention resides broadly in the method characterized in that the refining agents added are metal oxides which, during the refining operation, release oxygen and are converted into the metallic state.

Still another feature of the invention resides broadly in the method characterized in that the refining agents added are metal oxides such as ZnO, As2O3, Sb2O3, Bi2O3 and/or SnO.

A further feature of the invention resides broadly in the method characterized in that the refining agents added are inorganic salts which above 1500 degree C., in particular above 1600 degree C., have a vapor pressure of grater than 105 Pa.

Another feature of the invention resides broadly in the method characterized in that the inorganic salts added are halides, in particular chlorides, such as KCl, CaCl2, BaCl2, LaCl3, CeCl3, YbCl2, ErCl3, ErCl3, or fluorides, such as LiF, NaF, KF, ZNF2, MgF2, BaF2, or rare earth fluorides.

Yet another feature of the invention resides broadly in the method characterized in that the refining agents added are inorganic salts which, above 1500 degree C., in particular above 1600 degree C., decompose, releasing refining gas, and the decomposition products have a gas pressure of greater than 105 Pa.

Still another feature of the invention resides broadly in the method characterized in that the inorganic salts added are compounds which contain oxo anions, in particular sulfates, such as K2SO4, MgSO4, CaSO4, SrSO4, BaSO4, La2(SO4) 3.

A further feature of the invention resides broadly in the method characterized in that the release of refining gas is established by one or more refining agents.

Another feature of the invention resides broadly in the method characterized in that non-toxic refining agents are added.

Yet another feature of the invention resides broadly in a the method characterized in that the refining is assisted by a physical refining methods.

Still another feature of the invention resides broadly in the method characterized in that the molten glass is heated in a forcibly cooled crucible or a forcible cooled tank furnace.

A further feature of the invention resides broadly in the method characterized in that the molten glass is heated in a forcibly cooled skull crucible, by high-frequency means.

Examples of apparatus and processes relating to glass melting and refining which may be incorporated in embodiments of the present invention may be found in U.S. Pat. No. 6,101,847 issued on Aug. 15, 2000 to Shamp, et al. and entitled "Method of firing a glass melting furnace with oxygen"; U.S. Pat. No. 6,079,229 issued on Jun. 27, 2000 to Legiret, et al. Ado entitled "Process for improving the thermal profile of glass ovens"; U.S., Pat. No. 6,047,565 issued on Apr. 11, 2000 to Moreau and entitled "Method and device for reducing the Nox emission in a glass furnace"; U.S. Pat. No. 5,979,191 issued on Nov. 9, 1999 to Jian and entitled "Method and apparatus for melting of glass batch materials"; U.S. Pat. No. 5,849,058 issued on Dec. 15, 1998 to Takceshita, et al. Ado entitled "Refining method for molten glass and apparatus for refining molten glass"; U.S. Pat. No. 5 ,655,464 issued on Aug. 12 , 1997 to Moreau, et al. Ado entitled "Apparatus for melting glass"; U.S. Pat. No. 5,613,994 issued an Mar. 25, 1997 to Muniz, et al. Ado entitled "Electric furnace for melting glass"; U.S. Pat. No. 5,573,564 issued on Nov. 12, 1996 to Richards and entitled "Glass melting method"; U.S. Pat. No. 5,426,663 issued on Jun. 20, 1995 to Lythgoe and entitled "Glass melting"; U.S. Pat. No. 5,370,723 issued to Trevelyan, et al. on Dec. 6, 1994 and entitled "Glass melting furnace with control of the glass flow in the riser"; U.S. Pat. No. 5,194,081 issued on Mar. 16, 1993 to Trevelyan, et al. Ado entitled "Glass melting process"; U.S. Pat. No. 5,123,942 issued on Jun. 23, 1992 to Argent, et al. Ado entitled "System for charging batch/cullet in a glass furnace"; U.S. Pat. No. 4,816,056 issued on Mar. 28, 1989 to Tsai, et al. Ado entitled "Heating and agitating method for multi-stage melting and refining glass"; U.S. Pat. No. 4,741,753 issued on May 3, 1988 to Sheinkop, et al. Ado entitled "Method and apparatus for electrically heating molten glass"; U.S. Pat. No. 4,725,299 issued on Feb. 16, 1988 to Khinkis, et al. Ado entitled "Glass melting furnace and process"; U.S. Pat. No. 4,632,687 issued on Dec. 30, 1986 to Kunkle, et al. Ado entitled "Method of melting raw materials for glass or the like using solid fuels or fuel-batch mixtures"; U.S. Pat. No. 4,557,743 issued on Dec. 10, 1985 to Claes, et al. Ado entitled "Method and apparatus for monitoring the redox state of elements in glass"; U.S. Pat. No. 4,549,895 issued on Oct. 29, 1985 to Izumitani, et al. Ado entitled "Method and apparatus for melting glass"; U.S. Pat. No. 4,517,000 issued on May 14, 19B5 to Burget, et al and entitled "Apparatus for producing molten glass"; U.S. Pat. No. 4,317,669 issued on Mar. 2, 1982 to Boss, et al. Ado entitled "Glass melting furnace having a submerged weir"; U.S. Pat. No. 4,277,277 issued on Jul. 7, 1981 to Propster and entitled Feeding agglomerates to a glass melting furnace"; U.S. Pat. No. 4,149,022 issued on Apr. 10, 1979 to Hrycik and entitled "Power control system for electrically melting glass"; U.S. Pat. No. 4,119,395 issued on Oct. 10, 1978 to Hatanaka, et al. Ado entitled "Method of recovering heat of combustion wash gas arising from glass tank furnace"; U.S. Pat. No. 4,110,097 issued on Aug. 29, 1978 to Chevallier, et al. Ado entitled "Method for the manufacture of glass"; U.S. Pat. No. 4,082,528 issued on Apr. 4, 1978 to Lythgoe, et al. Ado entitled "Glass melting tank with temperature control and method of melting"; U.S. Pat. No. 4,047,918 issued Sep. 13, 1977 to Heithoff and entitled "Water cooled stirrer"; U.S. Pat. No. 3,997,315 issued on Dec. 14, 1979 to Rhodes, et al. Ado entitled "Glass melting"; U.S. Pat. No. 3,961,126 issued on Jun. 1, 1976 to Maddux and entitled "Apparatus and method for increasing electric power in an electric glass-melting furnace"; U.S. Pat. No. 3,951,635 issued on Apr. 20, 1976 to Rough, Sr. Ado entitled "Method for rapidly melting and refining glass"; and U.S. Pat. No. 3,942,968 issued on Mar. 9, 1976 to Pieper and entitled "Method and apparatus for melting and subsequently refining glass".

The features disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The following patents, patent applications, or patent publications are hereby incorporated by reference as if set forth in their entirety herein as follows: Germany Patent No. 196 16 633 C1, inventor Speit; Germany Patent Publication DE-OS 197 25 552 A1, inventors Drescher, et al; Germany Patent Publication 197 39 912, of Schott Glaswerke; Germany Patent No. 33 16 546, inventors Mateika, et al.: U.S. Pat. No. 4,687,646 issued on Aug. 18, 1987 to Hateika, et al. Ado entitled "Cold crucible for melting and crystallizing non-metallic inorganic compounds"; Germany Laid Open Patent Application DE-OS 38 01 840 A1, inventor Kiefer; U.S. Pat. No. 5,045,509 issued on Sep. 3, 1991 to Kiefer and entitled "UV-transparent glass"; Japanese Patent Publication JP 09 301 737 A, inventor Sakamoto; and U.S. Pat. No. 4,396,720 issued on Aug. 2, 1983 to Beall, et al. Ado entitled "Transparent glass-ceramics containing mullite".

The corresponding foreign and international patent publication applications, namely, Federal Republic of Germany Patent Application No. 199 39 771.6-45, filed on Aug. 21, 2000, having inventors Hildegard Römer, Werner Kiefer, Detlef Köpsel, Peter NaB, Erich Rodek, Uwe Kolberg, Thomas Pfeiffer, and DE-OS 199 39 771.6 and DE-PS 199 39 771.6, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at Applicants option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

This invention as described hereinabove in the context of the preferred embodiments is not to be taken as limited to all of the provided details thereof, since modifications and variations thereof may be made without departing from the, spirit and scope of the invention.

What is claimed is:

1. A glass melt refining method for refining glass, said glass consisting essentially of a member of the group: aluminosilicate glass, borosilicate glass, soda-lime glass, and glass ceramic material, said method comprising the steps of:
    (a) forming a melt of molten glass by heating glass to a temperature above the melting point of the glass;
    (b) adding a refining agent to form refining gas in said melt in a quantity sufficient to produce a sufficient volume of refining gas in said melt of molten glass at a temperature above about 1600 degrees Celsius to refine said melt of molten glass, said refining agent consisting essentially of a member of the group: (I), (II), (III), and combinations thereof, wherein
        (I) comprises redox compounds, said redox compounds comprising redox oxides, said redox oxides consisting essentially of a member of the group and combinations thereof: $SnO_2$, $CeO_2$, $Fe_2O_3$, $ZnO$, $TiO_2$, $V_2O_5$, $MoO_3$; $WO_3$, $Bi_2O_5$, $PrO_2$, $Sm_2O_3$, $Nb_2O_5$, $Eu_2O_3$, $TbO_2$, and $Yb_2O_3$,
        (II) comprises metal oxides, said metal oxides consisting essentially of a member of the group and combinations thereof: $ZnO$, $As_2O_3$, $Sb_2O_3$, $Bi_2O_3$, and $SnO_2$,
        (III) comprises inorganic salts, said inorganic salts comprising halides, said halides comprising at least one and combinations of: chlorides, fluorides, and rare earth fluorides, consisting essentially of a member of the group and combinations thereof: $KCl$, $CaCl_2$, $BaCl_2$, $LaCl_3$, $CeCl_3$, $YbCl_2$, $ErCl_3$, $PrCl_3$, and said fluorides comprising at least one and combinations of: $LiF$, $NaF$, $KF$, $ZnF_2$, $MgF_2$, $BaF_2$, $CeF_3$, and rare earth fluorides;
    (c) refining said melt of molten glass at a temperature between 1700 degrees Celsius and about 2800 degrees Celsius to refine said melt of molten glass by expelling refining gas; and
    (d) withdrawing refined molten glass from said melt.

2. The method according to claim 1 wherein said refining said melt of molten glass comprises refining said melt of molten glass at a temperature between 1700 and about 2400 degrees Celsius.

3. The method according to claim 1 wherein said melt is formed in one of: a forcibly cooled crucible and a forcible cooled tank furnace; and
    further comprising:
        assisting refining by physical refining methods.

4. The method of claim 1 wherein said melt is formed in a forcibly cooled skull crucible by high-frequency apparatus.

5. A method of refining high-melting glass material, said method comprising the steps of:
    (a) heating high-melting glass material to a-temperature above its melting point to produce a melt of high-melting glass material;
    (b) adding a refining agent, said refining agent being added in a sufficient quantity to form a sufficient volume of refining gas at a temperature above about 1600 degrees Celsius to maximize release of refining gas to refine said melt of high-melting glass material; said refining agent consisting essentially of a member of the group: (I), (II), (III), and combinations thereof, wherein
        (I) comprises redox compounds, said redox compounds comprising redox oxides, said redox oxides consisting essentially of a member of the group and combinations thereof: $SnO_2$, $CeO_2$, $Fe_2O_3$, $ZnO$, $TiO_2$, $V_2O_5$, $MoO_3$, $WO_3$, $Bi_2O_5$, $PrO_2$, $Sm_2O_3$, $Nb_2O_5$, $Eu_2O_3$, $TbO_2$, and $Yb_2O_3$,
        (II) comprises metal oxides, said metal oxides consisting essentially of a member of the group and combinations thereof: $ZnO$, $As_2O_3$, $Sb_2O_3$, $Bi_2O_3$, and $SnO_2$,
        (III) comprises inorganic salts, said inorganic salts comprising halides, said halides comprising at least one and combinations of: chlorides, fluorides, and rare earth fluorides, consisting essentially of a member of the group and combinations thereof: $KCl$, $CaCl_2$, $BaCl_2$, $LaCl_3$, $CeCl3$, $YbCl_2$, $ErCl_3$, $PrCl_3$, and said fluorides comprising at least one and combinations of: $LiF$, $NaF$, $KF$, $ZnF_2$, $MgF_2$, $BaF_2$, $CeF_3$, and rare earth fluorides;
    (c) refining the melted high-melting glass material at a temperature between 1700 degrees Celsius and about 2800 degrees Celsius by expelling refining gas from the melted high-melting glass material; and
    (d) withdrawing refined high-melting glass material.

6. The method according to claim 5 wherein said refining agent comprises at least one non-toxic refining agent.

7. A method of refining molten glass, said method comprising the steps of:
    (a) heating glass to a temperature above its melting point to produce a melt of molten glass;
    (b) adding a refining agent capable of forming refining gas in said melt of molten glass at a temperature above about 1600 degrees Celsius in a quantity sufficient to produce a sufficient volume of refining gas to refine said melt of molten glass;
    (c) refining said melt of molten glass at a temperature between 1700 degrees Celsius and about 2800 degrees Celsius by expelling refining gas from the melt of molten glass; and
    (d) withdrawing refined molten glass from said melt of molten glass.

8. The method of claim 7 wherein said refining agent comprises redox compounds, said redox compounds comprising redox oxides, said redox oxides consisting essentially of a member of the group and combinations thereof: $SnO_2$, $CeO_2$, $Fe_2O_3$, $ZnO$, $TiO_2$, $V_2O_5$, $MoO_3$, $WO_3$, $Bi_2O_5$, $PrO_2$, $Sm_2O_3$, $Nb_2O_5$, $Eu_2O_3$, $TbO_2$, and $Yb_2O_3$.

9. The method of claim 7 wherein said refining agent comprises metal oxides, said metal oxides consisting essentially of a member of the group and combinations thereof: $ZnO$, $As_2O_3$, $Sb_2O_3$, $Bi_2O_3$, and $SnO_2$.

10. The method of claim 7 wherein said refining agent comprises inorganic salts, said inorganic salts comprising halides, said halides comprising at least one and combinations of: chlorides, fluorides, and rare earth fluorides, consisting essentially of a member of the group and combinations thereof: KCl, $CaCl_2$, $BaCl_2$, $LaCl_3$, $CeCl_3$. $YbCl_2$, $ErCl_3$, $PrCl_3$, and said fluorides consisting essentially of a member of the group and combinations thereof: LiF, NaF, KF, $ZnF_2$, $MgF_2$, $BaF_2$, and $CeF_3$, and rare earth fluorides.

11. The method according to claim 7 wherein said refining step (c) is carried out at a temperature of the melt between 1700 degrees Celsius and about 2400 degrees Celsius.

12. The method according to claim 11 and further comprising:
adjusting the viscosity of said melt of molten glass to a level of less than $10^3$ dPas.

13. The method according to claim 12 wherein the viscosity of said melt of the molten glass is adjusted to a level of less than $10^2$ dPas.

14. The method according to claim 13 wherein said melt of molten glass is heated to the temperature at which the maximum release of refining gas from said refining agent takes place.

15. The method according to claim 14 wherein said refining agent is at least one metal oxide which, during said refining step (c), releases oxygen and is converted to its metallic state.

16. The method according to claim 14 wherein said refining agent comprises at least one inorganic salt, said at least one inorganic salt having a vapor pressure of greater than $10^5$ Pa at one of the following: a temperature above about 1500 degrees Celsius and a temperature above about 1600 degrees Celsius.

17. The method according to claim 16 wherein said at least one inorganic salt comprises an inorganic salt capable of decomposing thereby releasing refining gas, and the resultant decomposition products having a gas pressure of greater than $10^5$ Pa at one of: a temperature above about 1500 degrees Celsius and a temperature above about 1600 degrees Celsius.

18. The method according to claim 17 wherein said at least one inorganic salt comprises a compound, said compound containing oxo anions comprising a sulfate, said sulfate consisting essentially of a member of the group and combinations thereof: $K_2SO_4$, $MgSO_4$, $CaSO_4$, $SrSO_4$, $BaSO_4$, and $La_2(SO_4)_3$.

19. The method according to claim 7, wherein said method further comprises the step of generating refining gas by said refining agent, wherein the maximum generation of said refining gas by said refining agent takes place at a temperature over 1600° C.

20. The method according to claim 19, wherein said melt of molten glass is heated to the temperature at which the maximum release of said refining gas from said refining agent takes place.

21. The method according to claim 20, wherein:
said refining step is carried out at a temperature of the melt between 1700 degrees Celsius and about 2400 degrees Celsius;
said method further comprises the steps of:
adjusting the viscosity of said melt of molten glass to a level of less than one of $10^3$ dPas or $10^2$ dPas;
assisting refining by physical refining methods; and
heating said glass in one of:
a forcibly cooled crucible;
a forcibly cooled tank furnace; and
a forcibly cooled skull crucible by high-frequency apparatus; and
said refining agent comprises at least one non-toxic refining agent and consists essentially of a member of the group (A), (B), and (C), wherein (A), (B), and (C) are:
(A) redox compounds, said redox compounds comprising redox oxides, said redox oxides consisting essentially of a member of the group and combinations thereof: $SnO_2$, $CeO_2$, $Fe_2O_3$, ZnO, $TiO_2$, $V_2O_5$, $MoO_3$, $WO_3$, $Bi_2O_5$, $PrO_2$, $Sm_2O_3$, $Nb_2O_5$, $Eu_2O_3$, $TbO_2$, and $Yb_2O_3$;
(B) metal oxides, said metal oxides consist essentially of a member of the group and combinations thereof: ZnO, $As_2O_3$, $Sb_2O_3$, $Bi_2O_3$, and $SnO_2$; and
said metal oxides, during said refining step (c), are configured to release oxygen and be converted to their metallic state; and
(C) inorganic salts, said inorganic salts comprise one of:
halides, said halides comprise at least one and combinations of: chlorides, fluorides, and rare earth fluorides, consisting essentially of a member of the group and combinations thereof: KCl, $CaCl_2$, $BaCl_2$, $LaCl_3$, $CeCl_3$, $YbCl_2$, $ErCl_3$, $PrCl_3$, and said fluorides consisting essentially of a member of the group and combinations thereof: LiF, NaF, KF, $ZnF_2$, $MgF_2$, $BaF_2$, and $CeF_3$, and rare earth fluorides; and
compounds, said compounds containing oxo anions comprising a sulfate, said sulfate consisting essentially of a member of the group and combinations thereof: $K_2SO_4$, $MgSO_4$, $CaSO_4$, $SrSO_4$, $BaSO_4$, and $La_2(SO_4)_3$;
said inorganic salts have a vapor pressure of greater than $10^5$ Pa at one of the following: a temperature above about 1500 degrees Celsius and a temperature above about 1600 degrees Celsius; and
said inorganic salts comprise inorganic salts capable of decomposing thereby releasing refining gas, and the resultant decomposition products have a gas pressure of greater than $10^5$ Pa at one of: a temperature above about 1500 degrees Celsius and a temperature above about 1600 degrees Celsius.

22. The method according to claim 19, wherein said refining step is carried out at a temperature of the melt between 1700 degrees Celsius and about 2400 degrees Celsius.

23. The method according to claim 22, wherein:
said method further comprises the steps of:
adjusting the viscosity of said melt of molten glass to a level of less than one of $10^3$ dPas or $10^2$ dPas;
assisting refining by physical refining methods; and
heating said glass in one of:
a forcibly cooled crucible;
a forcibly cooled tank furnace; and
a forcibly cooled skull crucible by high-frequency apparatus; and
said refining agent comprises at least one non-toxic refining agent and consists essentially of a member of the group (A), (B), and (C), wherein (A), (B), and (C) are:
(A) redox compounds, said redox compounds comprising redox oxides, said redox oxides consisting essentially of a member of the group and combinations thereof: $SnO_2$, $CeO_2$, $Fe_2O_3$, ZnO, $TiO_2$, $V_2O_5$, $MoO_3$, $WO_3$, $BI_2O_5$, $PrO_2$, $Sm_2O_3$, $Nb_2O_5$, $Eu_2O_3$, $TbO_2$, and $Yb_2O_3$;
(B) metal oxides, said metal oxides consist essentially of a member of the group and combinations thereof: ZnO, $As_2O_3$, $Sb_2O_3$, $Bi_2O_3$, and $SnO_2$; and said metal oxides, during said refining step (c), are configured to release oxygen and be converted to their metallic state; and (C) inorganic salts, said inorganic salts comprise one of:

halides, said halides comprise at least one and combinations of: chlorides, fluorides, and rare earth fluorides, consisting essentially of a member of the group and combinations thereof: KCl, $CaCl_2$, $BaCl_2$, $LaCl_3$, $CeCl_3$, $YbCl_2$, $ErCl_3$, $PrCl_3$, and said fluorides consisting essentially of a member of the group and combinations thereof: LiF, NaF, KF, $ZnF_2$, $MgF_2$, $BaF_2$, and $CeF_3$, and rare earth fluorides; and compounds, said compounds containing oxo anions comprising a sulfate, said sulfate consisting essentially of a member of the group and combinations thereof: $K_2SO_4$, $MgSO_4$, $CaSO_4$, $SrSO_4$, $BaSO_4$, and $La_2(SO_4)_3$;

said inorganic salts have a vapor pressure of greater than $10^5$ Pa at one of the following: a temperature above about 1500 degrees Celsius and a temperature above about 1600 degrees Celsius; and said inorganic salts comprise inorganic salts capable of decomposing thereby releasing refining gas, and the resultant decomposition products have a gas pressure of greater than $10^5$ Pa at one of: a temperature above about 1500 degrees Celsius and a temperature above about 1600 degrees Celsius.

* * * * *